United States Patent
Kato et al.

(10) Patent No.: US 7,690,852 B2
(45) Date of Patent: Apr. 6, 2010

(54) IMAGING APPARATUS AND INTERCHANGEABLE LENS

(75) Inventors: Takashi Kato, Osaka (JP); Shin Miyashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 270 days.

(21) Appl. No.: 11/757,569

(22) Filed: Jun. 4, 2007

(65) Prior Publication Data
US 2007/0280679 A1 Dec. 6, 2007

(30) Foreign Application Priority Data
Jun. 5, 2006 (JP) ............... 2006-156004
Mar. 7, 2007 (JP) ............... 2007-057539

(51) Int. Cl.
*G03B 17/00* (2006.01)
*G02B 7/02* (2006.01)

(52) U.S. Cl. ...................... 396/529; 359/819

(58) Field of Classification Search ............... 396/529, 396/531, 532; 359/819; 348/360
See application file for complete search history.

(56) References Cited

U.S. PATENT DOCUMENTS 4,812,865 A * 3/1989 Ueyama ............... 396/530

2005/0031338 A1 * 2/2005 Koyama et al. ............ 396/531

FOREIGN PATENT DOCUMENTS

| JP | 10-3116 | 1/1998 |
|---|---|---|
| JP | 10-241 | 10/1998 |
| JP | 11-295798 | 10/1999 |
| JP | 2000-147359 | 5/2000 |
| JP | 2005-70711 | 3/2005 |
| JP | 2005-70712 | 3/2005 |
| JP | 2006-21398 | 1/2006 |
| JP | 2006-030499 | 2/2006 |
| JP | 2006-54055 | 2/2006 |

* cited by examiner

*Primary Examiner*—W. B. Perkey
*Assistant Examiner*—Minh Q Phan
(74) *Attorney, Agent, or Firm*—Oblon, Spivak, McClelland, Maier & Neustadt, L.L.P.

(57) ABSTRACT

There is provided an imaging apparatus on which an interchangeable lens is detachably mounted, which includes a mount unit to which the interchangeable lens is attached. In the imaging apparatus, the mount unit is provided with, on its periphery, a colored area having a specific color along an outer edge of said mount unit, and with respect to a specific interchangeable lens, which meets a predetermined requirement on adaptability to said imaging apparatus, among interchangeable lenses, a mount unit, which is connected to the mount unit of the imaging apparatus, of the specific interchangeable lens is provided with, on its periphery, a colored area having the same color as the specific color along an outer edge of the mount unit of the specific interchangeable lens.

20 Claims, 13 Drawing Sheets

IMAGING APPARATUS AND INTERCHANGEABLE LENS

BACKGROUND OF THE INVENTION

1. Field of the Invention

The present invention relates to a technology on an imaging apparatus that is detachably mounted with an interchangeable lens.

2. Description of Related Art

In lens interchangeable camera systems (imaging systems) such as single lens reflex cameras, there are cases where inadequate interchangeable lenses whose back focal lengths, for instance, are not suited to (a flange back of) a camera body are placed.

As technologies effective in preventing the inadequate interchangeable lenses of these types from being misplaced, some technologies have been proposed, which are to make it impracticable to physically place the inadequate interchangeable lens by changing the shape of a mount unit depending on the back focal length. See Japanese Patent Application Publication No. 2005-70711 (Patent Document 1) and Japanese Patent Application Publication No. 2005-70712 (Patent Document 2).

SUMMARY OF THE INVENTION

However, the technologies disclosed in the above patent documents 1 and 2 need to change the shape of the mount unit depending on the back focal length, so that the shapes of components contained in the mount unit become complicated (or diversified), and as well, use of common components gets into difficulties, leading to factors contributing to an increase in cost.

The present invention has been undertaken in view of the above problems, and is intended to provide a technology on an imaging apparatus that makes it possible to easily prevent inadequate interchangeable lenses from being misplaced.

A first aspect of the present invention relates to an imaging apparatus that is detachably mounted with an interchangeable lens, and has a mount unit to which the above interchangeable lens is attached. The above mount unit is provided with, on its periphery, a colored area having a specific color along an outer edge of the mount unit of the imaging apparatus, while with respect to a specific interchangeable lens, which meets predetermined requirements on adaptability to the above imaging apparatus, among interchangeable lenses, a mount unit, which is connected to the mount unit of the above imaging apparatus, of the above specific interchangeable lens is provided with, on its periphery, a colored area having the same color as the above specific color along an outer edge of the mount unit of the above specific interchangeable lens.

A second aspect of the present invention relates to an interchangeable lens that is detachably mounted on an imaging apparatus, and has a mount unit to be attached to the above imaging apparatus. The above mount unit is provided with, on its periphery, a colored area having a specific color along an outer edge of the mount unit of the interchangeable lens, while with respect to a specific imaging apparatus, which meets predetermined requirements on adaptability to the above interchangeable lens, among imaging apparatuses, a mount unit, which is connected to the mount unit of the above interchangeable lens, of the above specific imaging apparatus is provided with, on its periphery, a colored area having the same color as the above specific color along an outer edge of the mount unit of the above specific imaging apparatus.

It is noted that "the same color as the specific color" described the above includes not only the absolutely same colors as the specific color but also the similar colors recognized to be much the same as the specific color at a look.

DESCRIPTION OF THE PREFERRED EMBODIMENTS

[External Configuration of Imaging Apparatus]

FIGS. 1 to 6 illustrate an external configuration of an imaging apparatus 10 according to one embodiment of the present invention. More specifically, FIGS. 1 to 6 are views respectively showing the front, back, top, bottom, left side and right side of the imaging apparatus 10. The imaging apparatus 10 is detachably mounted with an interchangeable lens (a photographing lens) 2, in which case, there is shown, in FIG. 7, a perspective view of a camera system (an imaging system) 1 with the interchangeable lens 2 mounted on the imaging apparatus 10. The camera system 1 shown functions as a single lens reflex digital still camera, for instance.

Figure 1:
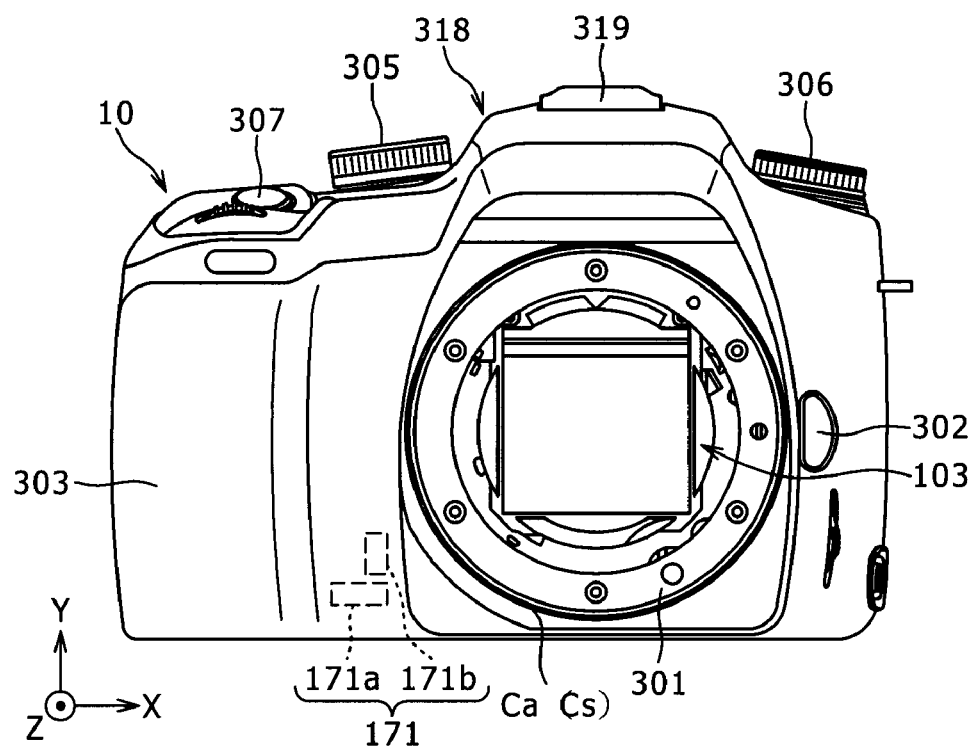
FIG. 1 is a view showing an external configuration of the front of an imaging apparatus according to one embodiment of the present invention.

Referring to FIG. 1, the imaging apparatus 10 has, at its front side, a mount unit 301 to which the interchangeable lens 2 is attached in the approximate center of the front, a lens interchange button 302 arranged beside the right of the mount unit 301, a grip portion 303 provided in a protuberant shape at a left end (a left side in X-direction) of the front and adaptable to be surely gripped (or held) by a user one-handed (or with both hands), a mode setting dial 305 arranged on a top left surface (a top left side in Y-direction) of the front, a control value setting dial 306 arranged on a top right surface of the front, and a shutter button 307 arranged on a top surface of the grip portion 303.

Figure 2:
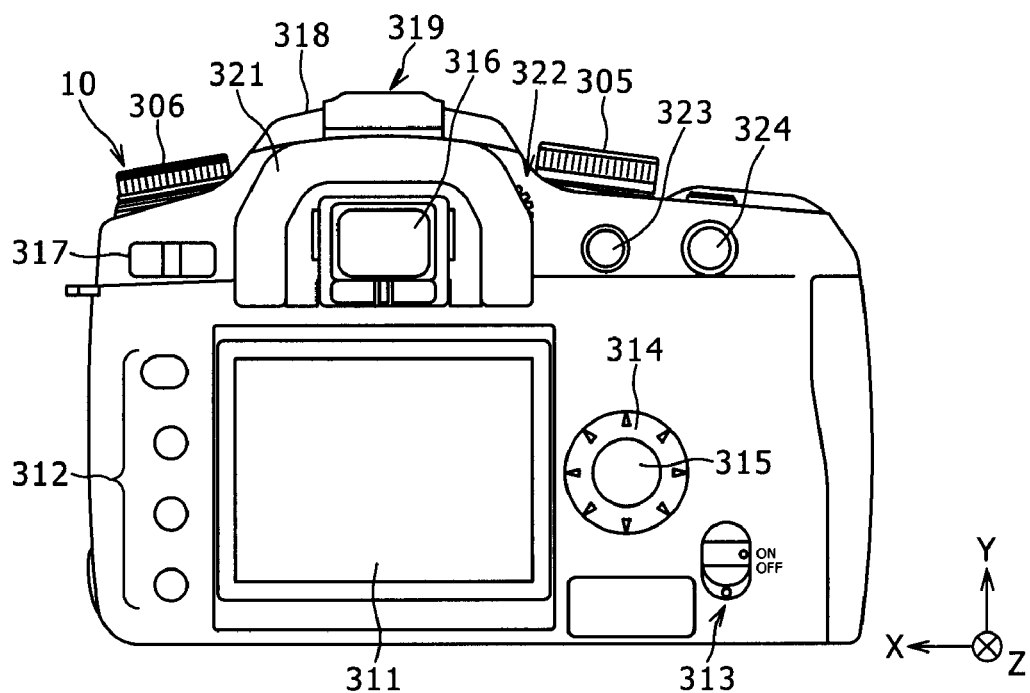
FIG. 2 is a view showing an external configuration of the back of the imaging apparatus.
Figure 3:
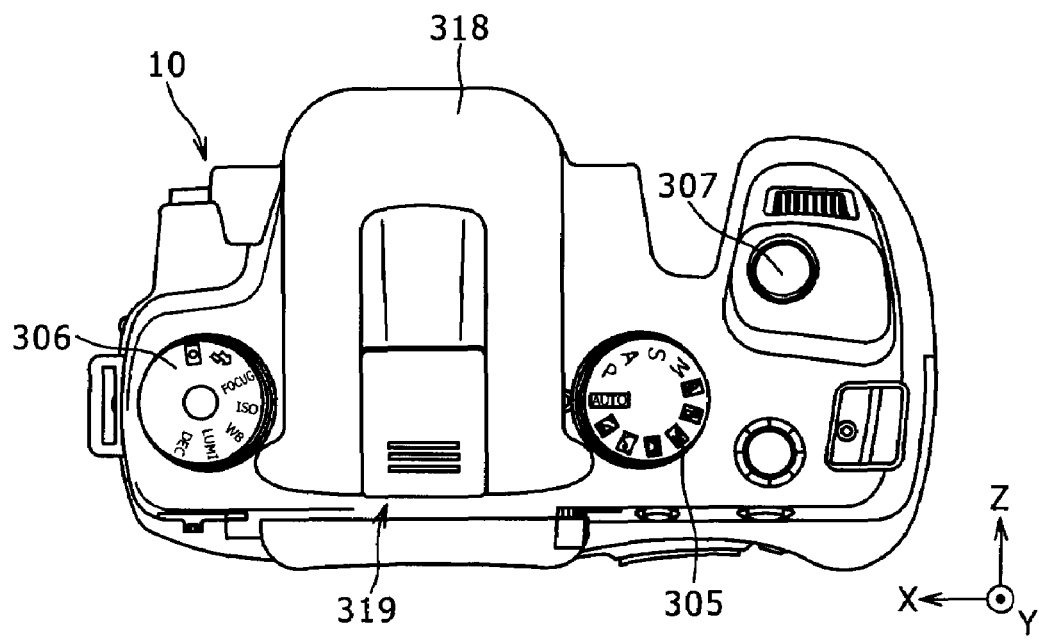
FIG. 3 is a view showing an external configuration of the top of the imaging apparatus.

Referring to FIG. 2, the imaging apparatus 10 also has, at its rear side, an LCD (Liquid Crystal Display) 311, a setting button group 312 arranged at the left of the LCD 311, a multi-direction key 314 arranged at the right of the LCD 311, a push button 315 arranged in the center of the multi-direction key 314 and a camera shake correction switch 313 arranged at the lower right of the multi-direction key 314. In addition, there are also provided, at the back of the imaging apparatus 10, an optical viewfinder 316 located above the LCD 311, an eye cup 321 located around the optical viewfinder 316, a diopter adjusting dial 322 located behind the eye cup 321, a main switch 317 located at the left of the optical viewfinder 316, an exposure correction button 323 and an AE lock button 324 both located at the right of the optical viewfinder 316, and a flash unit 318 and a connection terminal unit 319 both located above the optical viewfinder 316.

The mount unit 301 is a place where the interchangeable lens 2 is mounted, and has components such as more than one electric contact for making electric connection with the mounted interchangeable lens 2 and a coupler for making mechanical connection with the mounted interchangeable lens. In addition, the mount unit 301 is provided with, on its periphery, a color ring Ca (shown by a heavy line in FIG. 1) having a color such as orange, for instance, different from a surface color of the imaging apparatus 10 and from a color of the mount unit 301, as described later in detail. The color ring Ca shown is an annular member in the form of a circular ring having a certain line width.

The lens interchange button 302 is a button that is to be depressed when removing the mounted interchangeable lens 2 from the mount unit 301.

The grip portion 303 is to allow a user to grip the imaging apparatus 10 during shooting, and has surface irregularities provided in conformity with a finger shape for better fittingness. It is noted that the grip portion 303 accommodates a battery housing 69A (see FIG. 4) and a card housing 67A (see FIG. 6). A battery serving as a camera power source is housed in the battery housing 69A, and a recording medium (a memory card, for instance) for recording image data of taken images is supposed to be detachably housed in the card housing 67A. It is noted that the grip portion 303 may also have a grip sensor for detecting whether or not the user has got hold of the grip portion 303.

Each of the mode setting dial 305 and the control value setting dial 306 includes an approximately disc-shaped member that may be turned within a plane approximately parallel to the top surface of the imaging apparatus 10. The mode setting dial 305 is to select, in an alternative way, modes and functions provided in the imaging apparatus 10, such as those including an auto-exposure (AE) control mode and an auto-focusing (AF) control mode, or various shooting modes such as a still-image shooting mode for shooting of a single still image and a continuous shooting mode for continuous shooting, and a playback mode for playback of already recorded images. The control value setting dial 306 is to set control values with respect to various functions provided in the imaging apparatus 10.

The shutter button 307 is a depressible switch in which operations in "a half depression" provided by depressing the switch halfway, and operations in "a full depression" provided by more depressing the switch to the full are made executable. Depressing the shutter button 307 halfway (S1) in the still-image shooting mode brings setup operations (such as exposure control value setting and focusing) for shooting of still images of a subject to effect. Then, more depressing the shutter button 307 to the full (S2) brings shooting operations (a series of operations in which an imaging sensor is exposed to light, and image signals resulting from the exposure are given predetermined processing and then recorded onto the memory card and the like) to effect.

The LCD 311 has a color liquid crystal panel, and is to provide display of images imaged using an imaging device 101 (see FIG. 10 and the like) and playback display of already recorded images, and also, to display a setting display of the functions and the modes contained in the imaging apparatus 10. It is noted that an organic EL or a plasma display may be also used as a substitute for the LCD 311.

The setting button group 312 includes buttons that are to give effect to operations with respect to various functions contained in the imaging apparatus 10. More specifically, the setting button group 312 includes switches such as a select decision switch for making decision of contents selected on a menu display displayed on the LCD 311, a select cancel switch, a menu display switch for switching menu display contents, a display on/off switch and a display scale-up switch.

The camera shake correction switch 313 includes a button that is to apply operating signals for putting shake correcting operations with a shake correction unit 200 described later into effect. The camera shake correction switch 313 is to be depressed by the user for setting of a state in which the shake correcting operations for the imaging apparatus 10 come into effect, when the user feels anxiety that the "shake" such as a camera shake may affect a photographed image in a handheld shooting, a telephoto shooting, a shooting in the dark, a long exposure shooting or the like.

The multi-direction key 314 has an annular member having more than one push portion (those shown by triangular marks in the drawing) spaced at fixed intervals in a circumference direction, and is configured such that depression of the push portions is detected with non-illustrated contacts (or switches) provided in correspondence to the push portions. The push button 315 is arranged in the center of the multi-direction key 314. The multi-direction key 314 and the push button 315 are to input instructions such as those to change a zooming ratio (or shift a zoom lens in a wide-angle or telephoto direction), to feed frames of recorded images to be played back on the LCD 311 and to set shooting conditions (such as an aperture value, shutter speed, presence/absence of flash emission and the like).

The optical viewfinder 316 is to optically display a range in which shooting of the subject takes place. More specifically, a subject image is led through the interchangeable lens 2 to the optical viewfinder 316, so that the user may visually recognize the subject image actually taken by the imaging device 101 by looking in at the optical viewfinder 314.

The main switch 317 is a two-contact slide switch that slides left and right, and placing the main switch to the left allows the imaging apparatus 10 to be powered on, while placing the main switch to the right allows the imaging apparatus to be powered off.

Figure 7:
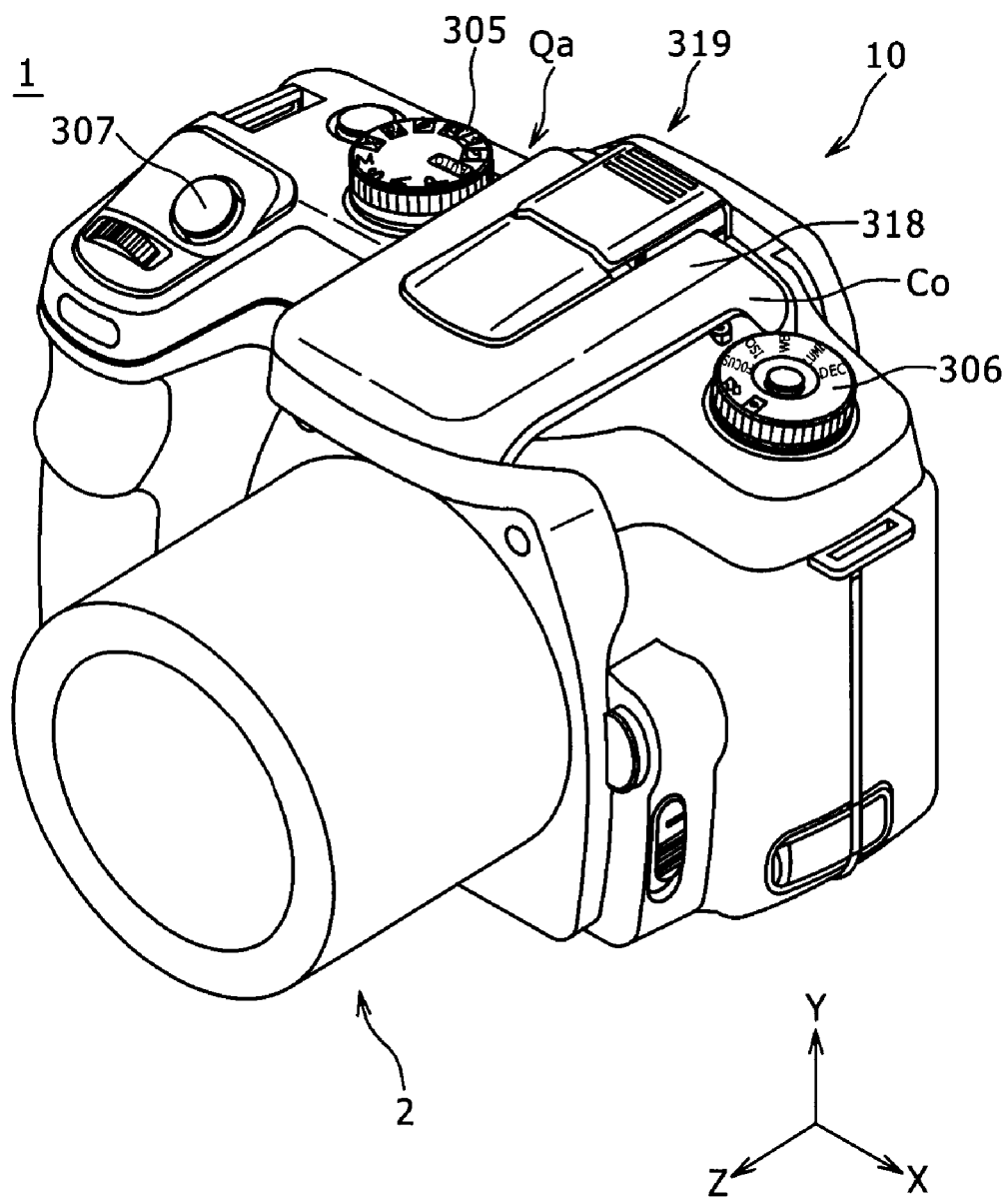
FIG. 7 is a perspective view showing a camera system with an interchangeable lens mounted on the imaging apparatus.
Figure 8:
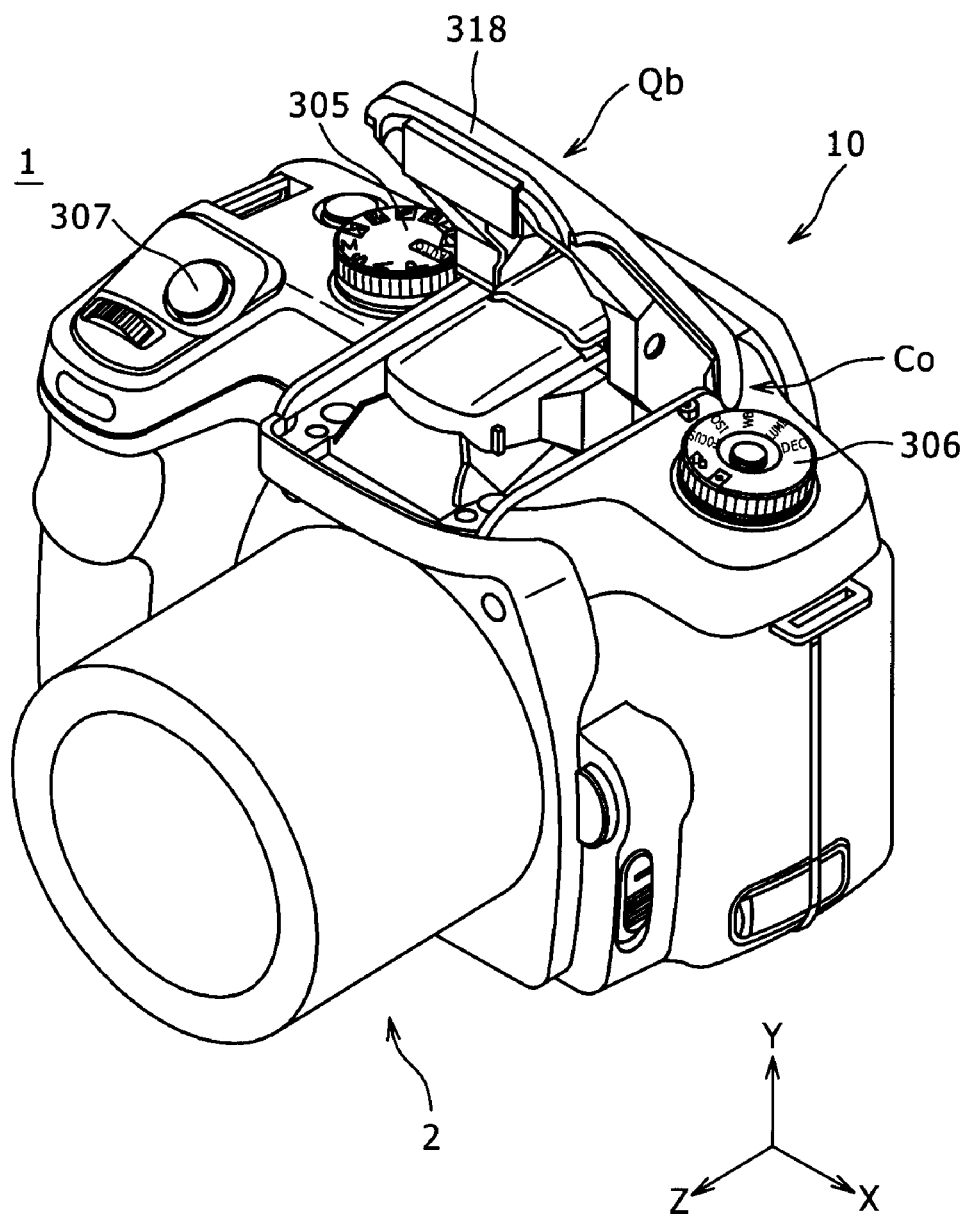
FIG. 8 illustrates a state in which a flash unit is in a pop-up position.

The flash unit 318 takes the form of a pop-up built-in flash, and may be switched between a pop-up position Qa shown in FIG. 8 and a prostrate position Qb shown in FIG. 7 by turning about an axis of turning Co (see FIGS. 7 and 8).

Meanwhile, for attaching an external flash and the like to the imaging apparatus 10, the connection terminal unit 319 is used to make connection between the external flash and the imaging apparatus. It is noted that in FIGS. 3, 7 and the like, there is shown the connection terminal unit 319 covered with a terminal cap.

The eye cup 321 includes a U-shaped shield member that provides light shielding to restrain external light from entering the optical viewfinder 316.

The diopter adjusting dial 322 is to make diopter adjustment of the optical viewfinder 316.

The exposure correction button 323 is to manually control an exposure value (an aperture value and/or a shutter speed). The AE lock button 324 is to fix the exposure.

The imaging apparatus 10 is equipped with a shake detection sensor 171 in an appropriate place of the imaging apparatus 10, as shown by a dotted line in FIG. 1. The shake detection sensor 171 is to detect shakes applied to the imaging apparatus 10 (a camera body) depending on camera shakes and the like. Assuming that there is a two-dimensional coordinate system where a horizontal direction in FIG. 1 represents an X-axis (a pitch direction) and a direction perpendicular to the X-axis represents a Y-axis (a yaw direction), the shake detection sensor 171 is available as a sensor having a pitch-direction sensor 171a for detecting camera shakes in the pitch direction, and a yaw-direction sensor 171b for detecting camera shakes in the yaw direction. Each of the pitch-direction sensor 171a and the yaw-direction sensor 171b includes a gyro (an angular velocity sensor) involving use of a piezoelectric device, for instance, and detects angular velocity of shakes in each direction.

The interchangeable lens 2 (see FIG. 7) functions as a lens window for capturing light (a light image) from the subject, and, is to configure a photographing optical system for leading the captured subject light to the imaging device 101 (described later) arranged inside the imaging apparatus 10, as well as to the optical viewfinder 316. Depressing the lens interchange button 302 described above allows the interchangeable lens 2 to be detached from the imaging apparatus 10.

Figure 9:
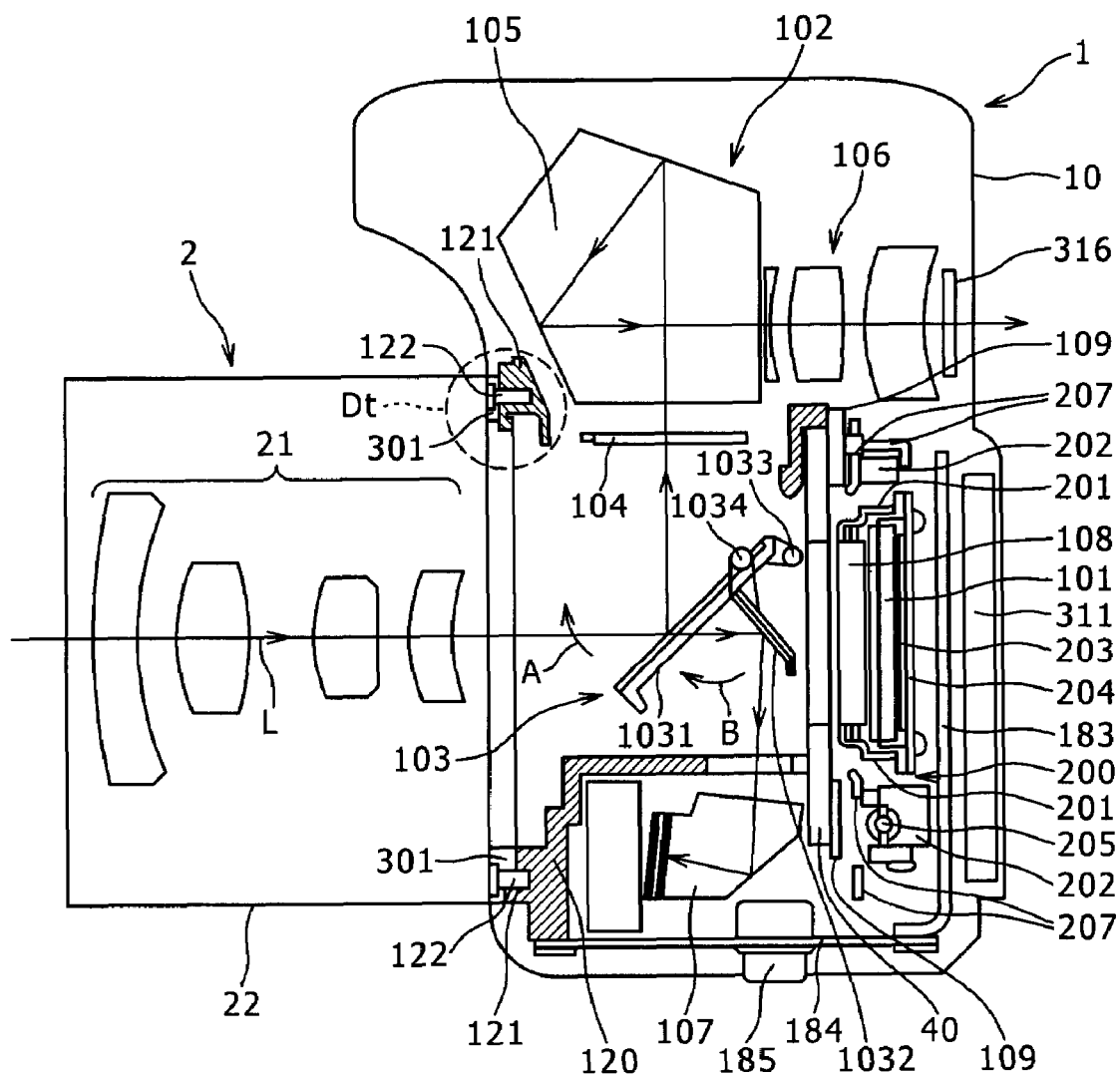
FIG. 9 is a longitudinal sectional view showing the camera system.

The interchangeable lens 2 has a lens group 21 including more than one lens arranged in series and along an optical axis L (see FIG. 9). The lens group 21 includes a focus lens 211 (see FIG. 10) for focusing, and a zoom lens 212 (see FIG. 10) for zooming, in which case, these lenses are driven in the direction of the optical axis L, permitting the zooming and the focal adjustment to come into effect. In addition, the interchangeable lens 2 also has a camera cone 22 (see FIG. 9) provided with, in its outer proper place, an operation ring that may be turned along an outer surface of the camera cone 22. Thus, it is configured so that the zoom lens 212 is shifted, through manual or automatic operation, in the direction of the optical axis depending on the direction and amount of turning of the operation ring so as to provide setting of a zooming ratio (a shot magnification factor) suited to a position where the zoom lens has reached.

Figure 4:
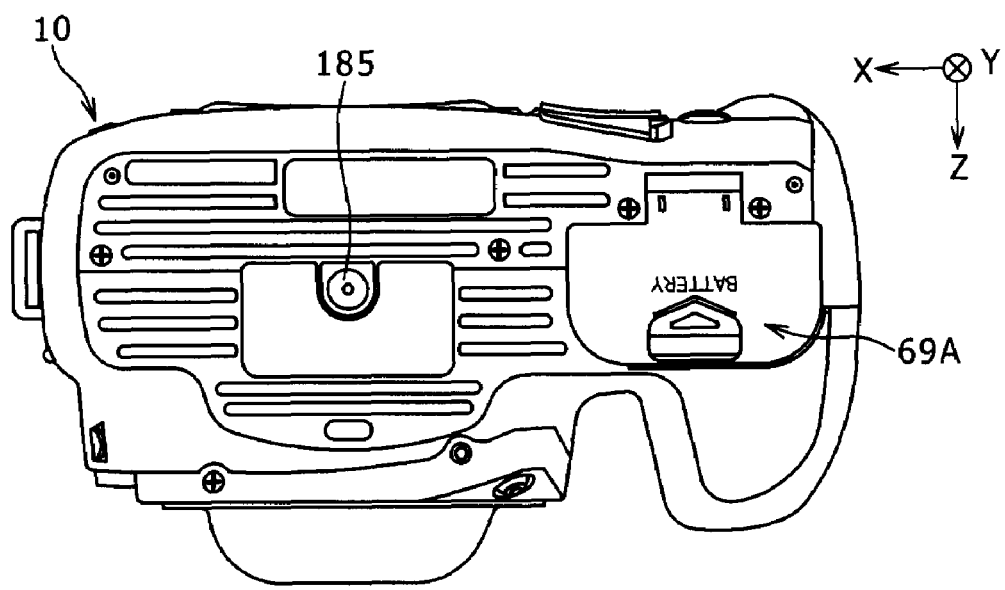
FIG. 4 is a view showing an external configuration of the bottom of the imaging apparatus.
Figure 5:
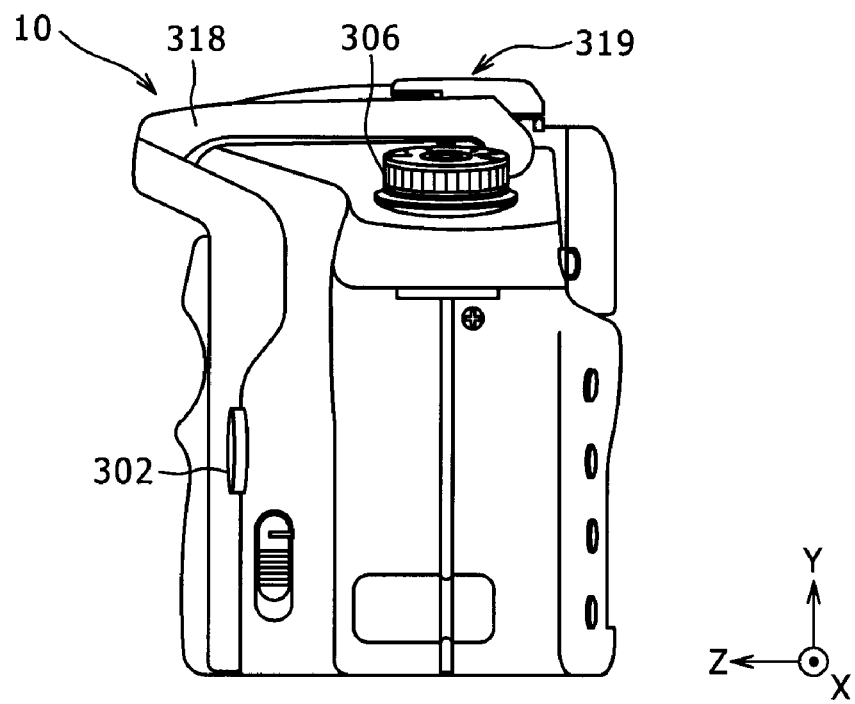
FIG. 5 is a view showing an external configuration of the left side of the imaging apparatus.
Figure 6:
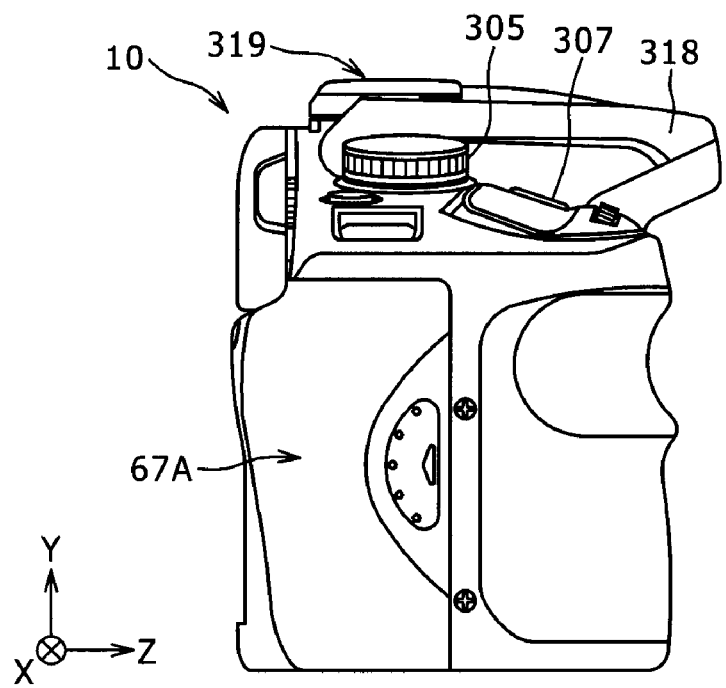
FIG. 6 is a view showing an external configuration of the right side of the imaging apparatus.

Referring to FIG. 4, the imaging apparatus 10 also has, at its bottom side, a tripod mount unit 185 to which a tripod for fixedly supporting the imaging apparatus 10 is attached.

[Internal Configuration of Camera System 1]

Next, an internal configuration of the camera system 1 is described. FIG. 9 is a longitudinal sectional view of the camera system 1. As shown in FIG. 9, the imaging apparatus 10 has, at its inside, components such as the imaging device 101, a viewfinder unit 102 (a viewfinder optical system), a mirror unit 103, a focus detection unit 107, the above-described shake detection sensor 171 and shake correction unit 200, and a shutter unit 40.

On the optical axis L of the lens group 21 contained in the interchangeable lens 2 in cases where the interchangeable lens 2 is placed on the imaging apparatus 10, the imaging device 101 stands at right angles to the optical axis L. For one instance of the imaging device 101, a Bayer-arrayed CMOS color area sensor (a CMOS imaging device) is used, in which more than one pixel configured with a photo diode is in a matrix-shaped two-dimensional arrangement, in which case, R (red), G (green) and B (blue) color filters having different spectral characteristics, for instance, are arranged in the ratio of 1:2:1 on a light detecting surface of each pixel. The imaging device (an imaging sensor) 101 converts a focused subject light image provided by the lens group 21 into analog electric signals (image signals) of respective R (red), G (green) and B (blue) color components, followed by outputting the analog electric signals as R, G and B color image signals.

On the above optical axis L, the mirror unit (a reflector) 103 is placed at a position where reflection of the subject light toward the viewfinder 102 occurs. The subject light having passed through the interchangeable lens 2 is reflected upwards with the mirror unit 103 (a main mirror 1031 described later), followed by being focused on a focusing screen 104. A part of the subject light having passed through the interchangeable lens 2 transmits through the mirror unit 103.

The viewfinder unit 102 has a pentaprism 105, an eyepiece 106 and the optical viewfinder 316. The pentaprism 105 includes a prism that takes a pentagonal shape in section and is to convert the subject light image having being incident through a lower surface of the pentagonal prism into an erect image by turning over the top, bottom, left and right of the above light image by intra-prism reflection. The eyepiece 106 leads the subject image provided in the form of the erect image by the pentaprism 105 to the outside of the optical viewfinder 316. The configuration as described the above ensures that the viewfinder unit 102 functions as an optical viewfinder useful for confirmations of a scene during standby for shooting.

The mirror unit 103 includes the main mirror 1031 and a sub mirror 1032, and may be pivotally turned such that at the back side of the main mirror 1031, the sub mirror 1032 comes down toward the back of the main mirror 1031. A part of the subject light having passed through the main mirror 1031 is reflected with the sub mirror 1032, and the reflected part of the subject light is allowed to enter the focal detection unit 107.

The above mirror unit 103 is available in the form of a so-called quick-return mirror, and with a rotary shaft 1033 as the fulcrum, springs upward as shown by an arrow A up to a position below the focusing screen 104 at the time of exposure. In this case, with a rotary shaft 1034 as the fulcrum, the sub mirror 1032 swings in a direction shown by an arrow B with respect to the back of the main mirror 1031. Thus, when the mirror unit 103 reaches the position below the focusing screen 104, the sub mirror is placed in a folded-up state so as to be in approximately parallel to the main mirror 1031. This mirror arrangement ensures that the subject light led through the interchangeable lens 2 reaches the surface of the imaging device 101 without being intercepted by the mirror unit 103, causing the imaging device 101 to be exposed to the light. On completion of the exposure, the mirror unit 103 restores to its initial position (a position shown in FIG. 9).

The focus detection unit 107 is available in the form of a so-called AF sensor including a ranging device and the like that detects focal information of the subject. The focus detection unit 107 is located under the mirror unit 103, and detects a focusing position according to a well-known phase difference detection scheme, for instance.

The imaging device 101 is held by the shake correction unit 200 such as to be two-dimensionally movable with respect to a plane orthogonal to the optical axis L. In addition, a low pass filter 108 (an IR cutting filter) for preventing incidence of infrared rays and also preventing occurrence of pseudo colors and/or color moire stripes is arranged just in front of the imaging device 101 in the direction of the optical axis. Further, the shutter unit 40 is placed just in front of the low pass filter 108. The shutter unit 40 is a mechanical focal plane shutter that has a vertically-movable shutter blind, and carries out operations of opening and closing an optical path for the subject light that is led to the imaging device 101 along the optical axis L.

A frame 120 (a front frame) is arranged in the approximate center of the imaging apparatus 10 with respect to the rear of the mount unit 301 (see a hatched portion in FIG. 9). The frame 120 is a rectangular cylindrical tubular body having substantially a rectangular shape as viewed from front and being opened in front and back portions and in an upper portion facing the pentaprism 105 (the focusing screen 104), and is made of a metal rigid body having a resistance against strain or the like. A front surface of the frame 120 has a cylindrical-shaped mount receiving portion 121 formed in conformity to the shape of the mount unit 301, and with the mount unit 301 fitted to the mount receiving portion 121, the frame 120 is fastened with more than one screw 122 from the front surface side of the frame. The frame 120 is to accommodate the mirror unit 103 therein, and is thus also used as a holding member for the mirror unit 103. The shutter unit 40 is supported with the frame 120 in such a manner as to be sandwiched between a rear end of the frame 120 and a shutter pressing plate 109 arranged in the rear of the frame 120.

The above components of the imaging apparatus 10 are interconnected (fixed) through a chassis made of a metal material such as iron, for instance. In the present embodiment, there is shown one instance where the above chassis is composed of a front chassis (not shown), a side chassis 183 and a bottom chassis 184. These chassis serve as supports that give support to the components contained in the above imaging apparatus 10. Then, the chassis are fixed to each other with machine screws, and the frame 120 is further fixed to an interconnected-chassis structure with screws, permitting these members to be integrated as a single structure. The bottom chassis 184 is provided with the above tripod mount unit 185.

[Details of Shake Correction Unit]

Next, a configuration of the shake correction unit 200 is described in detail with reference to FIG. 9. The shake correction unit 200 is composed of the imaging device 101, the low pass filter 108, an imaging device holder 201 that holds the low pass filter 108 together with the imaging device 101, a slider 202 that holds the imaging device holder 201, a radiation plate 203 located on the rear surface of the imaging device 101, an imaging device substrate 204 located on the rear surface of the heat radiation plate 203, a yaw direction actuator 205, a pitch-direction actuator (not shown) and a steady rest 207.

The imaging device substrate 204 is an approximately rectangular substrate to which the imaging device 101 is mounted. The imaging device 101 is mounted to the imaging device substrate 204 with the radiation plate 203 interposed between the imaging device 101 and the imaging device substrate 204. The radiation plate 203 includes a plate-like body made of a predetermined metal material, and is to release heat resulting from driving (photoelectric conversion) of the imaging device 101. The imaging device holder 201 is a frame having an approximately rectangular sectional shape and whose front and rear sides are open, in which case, the low pass filter 108 is installed in front of this frame, and the imaging device 101 is placed at the rear of the low pass filter 108. With the imaging device 101 pressed together with the radiation plate 204 against the imaging device holder 210 by the imaging device substrate 204, the imaging device substrate 204 is fastened and mounted to the imaging device holder 201 with screws.

The steady rest 207 is available as a so-called base with respect to the shake correction unit 200 in order to hold the slider 202 in a state where the imaging device holder 201 is held in position.

Then, leftward and rightward sliding of the slider 202 together with the imaging device holder 201 as a unit with respect to the steady rest 207 depending on driving of the yaw-direction actuator 205 installed at one end side of the imaging device holder 201 with respect to the vertical direction causes yaw-direction shakes of the imaging device 101 to be corrected. Also, upward and downward sliding of the imaging device holder 201 with respect to the slider 202 depending on driving of the pitch-direction actuator (not shown) installed at one end side of the imaging device holder 201 with respect to the lateral direction causes pitch-direction shakes of the imaging device 101 to be corrected.

[Electrical Configuration of Camera System 1]

Figure 10:
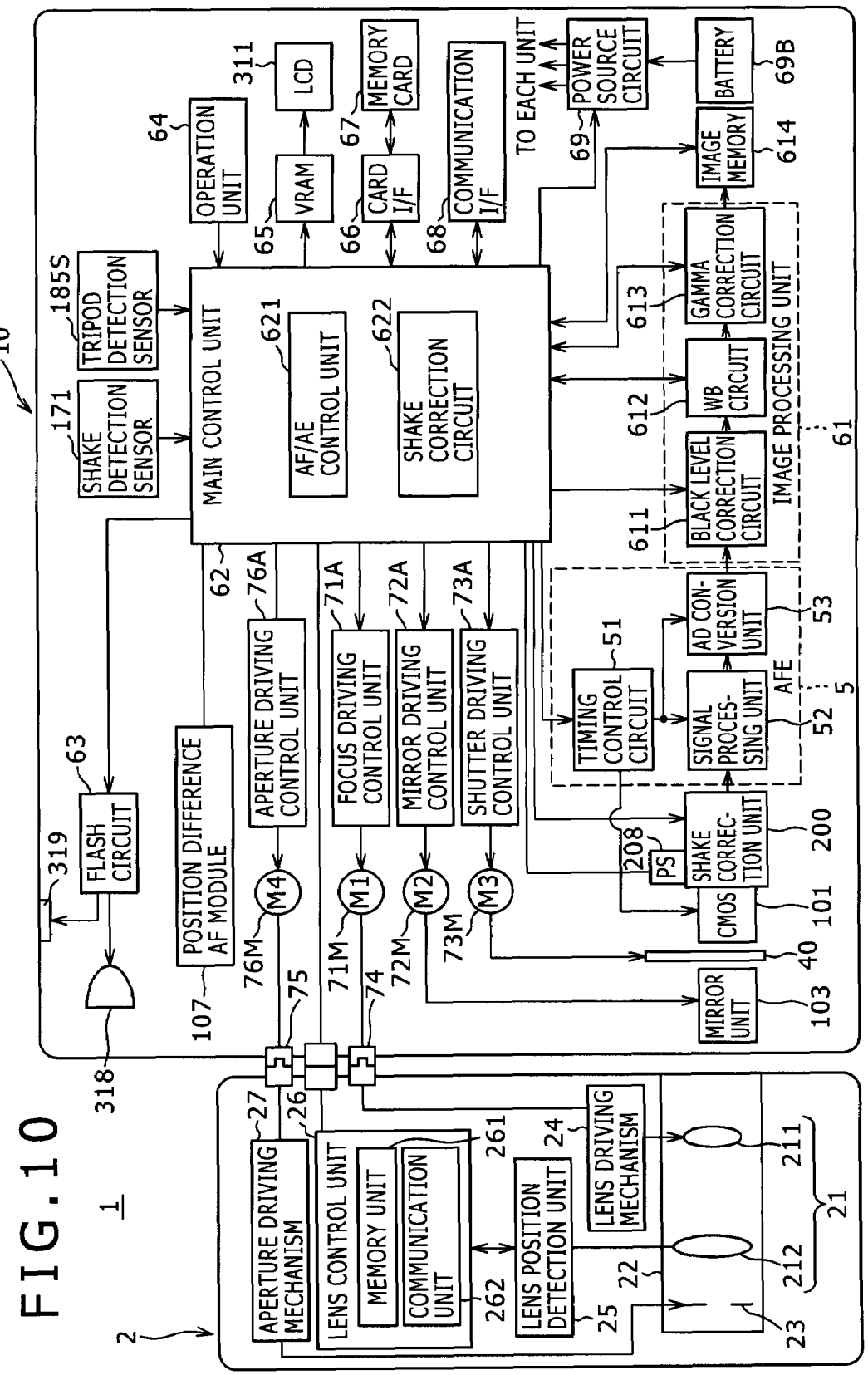
FIG. 10 is a block diagram showing an overall electric configuration of the camera system.

FIG. 10 is a block diagram showing an overall electrical configuration of the camera system 1. In FIG. 10, the same reference numerals are assigned to the similar members and the like as those shown in FIGS. 1 to 9. To meet the convenience of explanations, the electric configuration of the interchangeable lens 2 is firstly described. The interchangeable lens 2 has a lens driving mechanism 24, a lens position detection unit 25, a lens control unit 26 and an aperture driving mechanism 27, in addition to the lens group 21 and the camera cone 22 both contained in the above taking optical system.

The lens group 21 includes the camera cone 22 in which the focus lens 211 and the zoom lens 212 are held in alignment with the optical axis L, together with an aperture 23 for controlling a quantity of light allowed to enter the imaging device 101 contained in the imaging apparatus 10, and is to capture the subject light image for focusing on the imaging device 101 and the like. The lens group 21 is driven in the direction of the optical axis L (see FIG. 9) by an AF actuator 71M housed in the imaging apparatus 10, permitting changes of the zooming ratio (or the focal length) and focusing operations to come into effect.

The lens driving mechanism 24 includes components such as a helicoid and a gear (not shown) for turning the helicoid, and is to shift the lens group 21 as a unit in a direction parallel to the optical axis L in response to driving force supplied from the AF Actuator 71M through a coupler 74. It is noted that the direction and distance of shift of the lens group 21 respectively depend on the direction and speed of turning of the AF actuator 71M.

The lens position detection unit 25 has an encode plate having more than one code pattern spaced at a predetermined pitch in the direction of the optical axis L within the range of shift of the lens group 21, and an encoder brush moved as an integral part of the camera cone 22 in sliding contact with the encode plate, and is to detect the distance of shift of the lens group 21 during focusing.

The lens control unit 26 includes a microcomputer integrated with a memory unit 261 such as a ROM for storage of control programs and a flash memory for storage of data relating to condition information, for instance. In addition, the lens control unit 26 also includes a communication unit 262 for communications with a main control unit 62 of the imaging apparatus 10. The communication unit 262 transmits, to the main control unit 62, condition information data of the lens group 21, such as a focal length, an exit pupil position, an aperture value, a focusing distance and a relative illumination state, and on the other hand, receives, from the main control unit 62, data such as drive amount data of the focus lens 211. Also, data, such as focal length information and an aperture value, obtained after completion of the AF operation is transmitted from the communication unit 262 to the main control unit 62 during shooting. The above condition information data of the lens group 21 and data transmitted from the main control unit 62, such as the drive amount data of the focus lens 211, are stored in the memory unit 261.

The aperture driving mechanism 27 is to change an aperture diameter of the aperture 23 in response to driving force supplied from an aperture driving actuator 76M through a coupler 75.

Next, an electrical configuration of the imaging apparatus 10 is described. The imaging apparatus 10 is composed of an AFE (an analog front end) 5, an image processing unit 61, an image memory 614, the main control unit 62, a flash circuit 63, an operation unit 64, a VRAM 65, a card I/F 66, a memory card 67, a communications I/F 68, a power source circuit 69, a battery 69B, a focus driving control unit 71A including the AF actuator 71M, a mirror driving control unit 72A including a mirror driving actuator 72M, a shutter driving control unit 73A including a shutter driving actuator 73M, an aperture driving control unit 74A including an aperture driving actuator 74M, a position detection sensor (PS) 208 and a tripod detection sensor 185S, in addition to the previously described components such as the imaging device (CMOS) 101, the shake correction unit 200 for driving the imaging device for shake corrections and the shutter unit 40.

As previously described, the imaging device 101 is composed of the CMOS color area sensor, and whose imaging operations, such as start (and termination) of the exposure to the imaging device 101, output selection of each pixel contained in the imaging device 101 and readout of image signals are controlled by a timing control circuit 51 described later.

The AFE 5 applies timing pulses to the imaging device 101 to bring predetermined operations into effect, and at the same time, gives predetermined signal processing to image signals (a group of analog signals having been detected with each pixel of the CMOS area sensor) outputted from the imaging device 101, and then converts the processed image signals into digital signals, followed by outputting the digital signals to the image processing unit 61. The AFE 5 includes components such as the timing control circuit 51, a signal processing unit 52 and an A/D conversion unit 53.

The timing control circuit 51 generates predetermined timing pulses (pulses adapted to produce vertical scan pulses φVn, horizontal scan pulses φVm, reset signals φVr and the like) based on a reference clock outputted from the main control unit 62, followed by outputting these timing pulses to the imaging device 101 to control the imaging operations of the imaging device 101. In addition, the timing control circuit 51 also outputs predetermined timing pulses respectively to the signal processing unit 52 and the A/D conversion unit 53 to control operations of the signal processing unit 52 and the A/D conversion unit 53.

The signal processing unit 52 is to give predetermined analog signal processing to the analog image signals outputted from the imaging device 101. The signal processing unit 52 includes components such as a CDS (Correlated Double Sampling) circuit, an AGC (Auto Gain Control) circuit and a clamp circuit. The A/D conversion unit 53 is to convert R, G and B analog image signals outputted from the signal processing unit 52 into more than one-bit (12-bit, for instance) digital image signals based on the timing pulses outputted from the timing control circuit 51.

The image processing unit 61 is to create image files by giving predetermined signal processing to the image data outputted from the AFE 5, and includes components such as a black level correction circuit 611, a white balance control circuit 612 and a gamma correction circuit 613. The captured image data in the image processing unit 61 is once stored in the image memory 614 in synchronization with reading by the imaging device 101, and afterwards, access to the stored image data in the image memory 614 is made, causing processing to be performed in each block of the image processing unit 61.

The black level correction circuit 611 is to correct a black level of each of the A/D converted R, G and B digital image signals provided by the A/D conversion unit 53 so as to reach a reference black level.

The white balance correction circuit 612 is to perform level conversion (white balance (WB) control) of the digital signals of R (red), G (green) and B (blue) color components based on a white reference suited to a light source. More specifically, the white balance control circuit 612 specifies, on the basis of WB control data supplied from the main control unit 62, a portion presumed to be originally white judging from luminance and saturation data and the like with respect to the taken subject, and then calculates a mean of color components in the specified portion with respect to R, G and B color components, together with a G/R ratio and a G/B ratio, followed by making level correction with the calculated mean and ratios as R and B correction gains.

The gamma correction circuit 613 is to correct tone characteristics of the WB-adjusted image data. More specifically, the gamma correction circuit 613 performs non-linear conversion of image data levels using a predetermined gamma correction table provided for each color component, and at the same time, provides offset control of the image data levels.

The image memory 614 includes a memory used for temporary storage of image data outputted from the image processing unit 61 and also available as a working area for the main control unit 62 to give predetermined processing to the temporarily stored image data during the shooting mode. In addition, image data read out from the memory card 67 is temporarily stored in the image memory 614 during the reproduction mode.

The main control unit 62 includes a microcomputer integrated with a storage unit such as a ROM for storage of control programs and a flash memory for temporary storage of data, and is to control operations of various units contained in the camera system 1. The main control unit 62 is functionally provided with an AF/AE control unit 621 and a shake correction control unit 622. It is noted that the main control unit 62 also has a control function for shutter operations with respect to the imaging apparatus 10.

The AF/AE control unit 621 performs operation control required for auto-focusing control (AF) and auto-exposure control (AE). More specifically, for the auto-focusing control, the AF/AE control unit 621 is supposed to generate focusing control signals (AF control signals) through focusing processing carried out in accordance with a phase difference detection scheme by using output signals from the above focal detection unit (a phase difference AF module) 107, followed by operating the AF actuator 71M through the focus driving control unit 71A to give effect to driving of the focus lens 211. Meanwhile, for the auto-exposure control, the AF/AE control unit 621 is supposed to perform, based on subject luminance information and the like having been detected with an AE sensor (not shown), operations for calculating an appropriate exposure value (inclusive of a shutter speed and the like) with respect to the subject concerned.

The shake correction control unit 622 calculates, when the camera-shake correction mode is put into effect, the direction and amount of shakes on the basis of shake detection signals supplied from the shake detection sensor 171, and then generates shake correction control signals on the basis of the calculated direction and amount of shakes, followed by outputting the generated correction control signals to the shake correction unit 200, causing the imaging device 101 to be driven for shifting in a direction where the camera shakes are compensated for. For one instance where servo control is supposed to be performed, the shake correction control unit 622 finds an amount of shakes (a shake angle $\theta$) in each direction by integrating angular velocity signals having been detected with the shake detection sensor 171, and then calculates a distance $\delta 1$ ($\delta 1 = f \cdot \tan \theta$) of shift, which corresponds to the shake angle $\theta$, of the imaging device 101 depending on a lens profile, such as the focal length f, of the interchangeable lens 2. Then, the shake correction control unit 622 acquires position information $\delta 2$ of the imaging device 101 from the position detection sensor 208, and then generates drive signals that cause the imaging device 101 to be driven so as to meet an equation of $\delta 1 - \delta 2 = 0$, followed by supplying the drive signals to the shake correction unit 200.

The flash circuit 63 is to control, in a flash shooting mode, a luminous amount of the flash unit 318 or the external flash connected to the connection terminal unit 319 so as to reach a predetermined luminous amount provided by the main control unit 62.

The operating unit 64 includes the above components such as the mode setting dial 305, the control value setting dial 306, the shutter button 307, the setting button group 312, the camera shake correction switch 313, the multi-direction key 314, the push button 315 and the main switch 317, and is to input operating information to the main control unit 62.

The VRAM 65 is a buffer memory having an image signal storage capacity corresponding to the number of pixels of the LCD 311 and placed between the main control unit 62 and the LCD 311. The card IF 66 is an interface that makes it possible to transmit and receive signals between the memory card 67 and the main control unit 62. The memory card 67 includes a recording medium for storage of image data generated by the main control unit 62. The communications I/F 68 is an interface that makes it possible to transfer image data and the like to a personal computer and/or other external apparatuses.

The power source circuit 69 is composed of a circuit such as a constant voltage circuit, and generates voltage (5V, for instance) adapted to drive the overall camera system 1 including the control unit such as the main control unit 62, the imaging device 101 and other various driving units. Energizing to the imaging device 101 is controlled in response to control signals supplied from the main control unit 62 to the power source circuit 69. A battery 69B includes a primary battery such as alkali dry battery and a secondary battery such as nickel-hydrogen charging battery, and is available as a power source that feeds power to the overall camera system 1.

The focus driving control unit 71A is to generate, on the basis of the AF control signals supplied from the AF/AE control unit 621 of the main control unit 62, signals required to shift the focus lens 211 to an in-focus position, such as driving control signals with respect to the AF actuator 71M. The AF actuator 71M is composed of a motor such as a stepping motor, and applies lens driving force to the lens driving mechanism 24 of the interchangeable lens 2 through the coupler 74.

The mirror driving control unit 72A is to generate driving signals adapted to drive the mirror driving actuator 72M according to the timing of shooting operations. The mirror driving actuator 72M is an actuator adapted to turn the mirror unit 103 (the quick-return mirror) to a horizontal or inclined position.

The shutter driving control unit 73A is to generate, on the basis of the control signals supplied from the main control unit 62, driving control signals with respect to the shutter driving actuator 73M. The shutter driving actuator 73M is an actuator adapted to drive the shutter unit 40 so as to be opened or closed.

The aperture driving control unit 76A is to generate, on the basis of the control signals supplied from the main control unit 62, driving control signals with respect to the aperture driving actuator 76M. The aperture driving actuator 76M applies driving force to the aperture driving mechanism 27 through the coupler 75.

The position detection sensor 208 is to perform detection of the position of the imaging device 101 during shake correction driving or at the time of activating the camera. The position detection sensor unit 208 is constituted of a magnet unit which generates magnetic fluxes and a two-dimensional Hall sensor which outputs a signal corresponding to the intensity of magnetic fluxes radiated from the magnet unit. The configuration as described the above ensures that the position detection sensor 208 enables detection of the position of the imaging device 101 to be attained by detecting, with the two-dimensional Hall sensor, the position of the magnet unit that is moved following upward, downward, leftward and rightward movements of the imaging device holder 201 with respect to the steady rest 207.

The tripod detection sensor 185S includes a sensor such as a contact sensor having a contact unit, and is available as a sensor that electrically detects whether or not a tripod (a support leg) is on the tripod mount unit 185 located on the bottom chassis 184 of the imaging apparatus 10.

[Details of Color Rings]

As described the above, the mount unit 301 of the imaging apparatus 10 is provided with, on its periphery, the color ring Ca (see FIG. 1) available as a ring-shaped colored area having an orange color (or specific color) along an outer edge of the mount unit 301. Meanwhile, there is also provided the same color ring as the above color ring Ca at the interchangeable lens 2-side.

Figure 11:
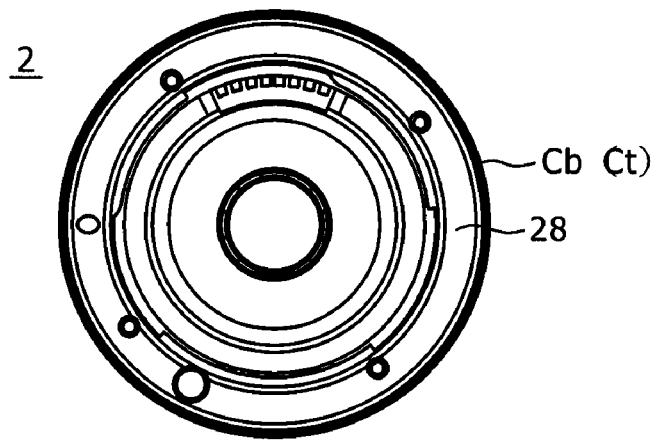
FIG. 11 is a view of the interchangeable lens as viewed from the rear.
Figure 12:
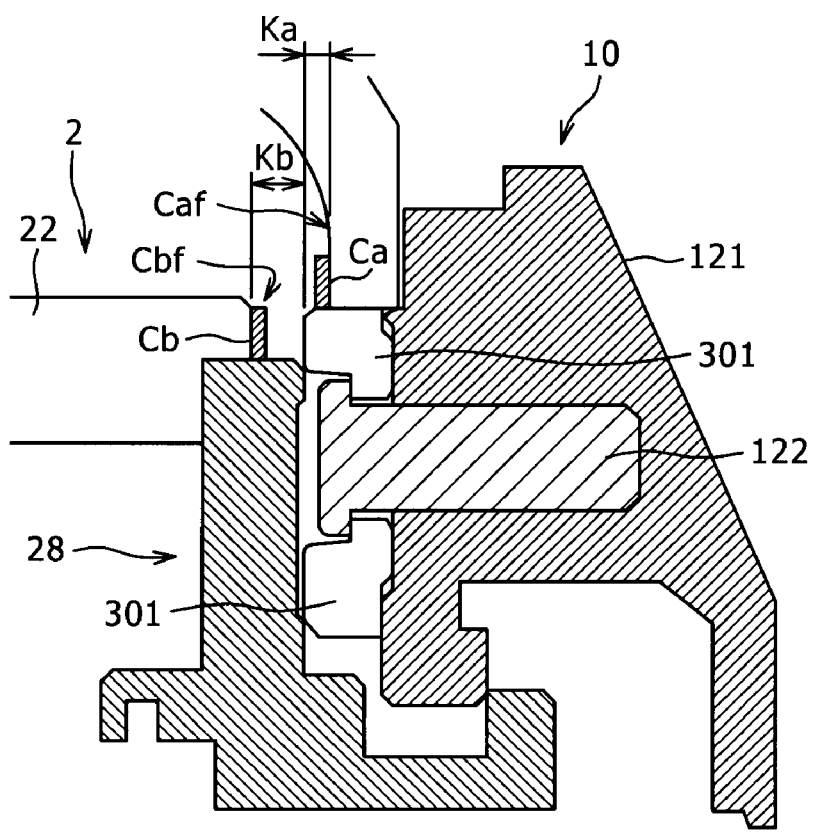
FIG. 12 is an enlarged view of a portion encircled by a broken line in FIG. 9.

FIG. 11 is a view of the interchangeable lens 2 as viewed from the back. FIG. 12 is an enlarged view of a portion Dt encircled by a broken line in FIG. 9.

As shown in FIG. 11, the interchangeable lens 2 has, at its back, a mount unit 28 connected to the mount unit 301 of the imaging apparatus 10, in which case, this mount unit 28 is provided with, on its periphery, a ring-shaped color ring Cb (shown by a bold outline) having, along an outer edge of the mount unit 28, a color, such as orange (or specific color), different from the surface color of the camera cone 22 and from the color of the mount unit 28.

The color ring Ca of the imaging apparatus 10 is formed in a manner that it is colored by printing on a front surface Caf, which stands back by a fixed distance Ka from a mounting reference surface (a joint surface) of the mount unit 301, of the imaging apparatus 10, as shown in FIG. 12. Likewise, the color ring Cb of the interchangeable lens 2 is also formed in a manner that it is colored by printing on a rear surface Cbf, which stands back by a fixed distance Kb from a joint surface of the mount unit 28, of the camera cone 22. By providing the color rings Ca, Cb at positions that stand back by one step from the joint surfaces of the mount units 301, 28 with respect the imaging apparatus 10 and the interchangeable lens 2 in this manner, contact of the color rings Ca, Cb with each other may be eliminated, so that it is possible to prevent the color of the color rings from coming off. In addition, by forming the color rings Ca, Cb by printing, coloring becomes facilitated, leading to contributions toward suppressing the cost increase.

With respect to the interchangeable lens 2, there is provided the color ring Cb on the surface Cbf parallel to the joint surface of the mount unit 28, so that the color ring Cb fails to be seen at the time of mounting of the interchangeable lens 2, and is then kept inconspicuous in appearance. Likewise, with respect to the imaging apparatus 10, there is also provided the color ring Ca on the surface Caf parallel to the joint surface of the mount unit 301, the color ring Ca is hard to be seen from the front of the camera at the time of mounting of the interchangeable lens, and is then kept inconspicuous in appearance. It is noted that, judging from a point of view on needs to restrain the color ring from standing out conspicuously at the time of mounting of the interchangeable lens, the color ring Ca (and the color ring Cb) is preferably in the form of a thin ring so far as it may not interrupt the user in one's visible confirmation previous to mounting of the interchangeable lens.

Supposing the color rings Ca, Cb are respectively provided for the imaging apparatus 10 and the interchangeable lens 2 as described above, it becomes possible to make judgment whether or not the interchangeable lens 2 to be mounted is a lens adequate for the imaging apparatus 10 in such a manner as to judge the colors of the color rings Ca, Cb of the imaging apparatus 10 and the interchangeable lens 2 to be the same or not. More specifically, with respect to one specific interchangeable lens 2, which meets predetermined requirements on adaptability to the imaging apparatus 10, among all the interchangeable lenses adaptable to be mounted to the imaging apparatus 10, supposing the color ring Cb having the same color as the color ring Ca of the imaging apparatus 10 is provided, it becomes possible to prevent the inadequate interchangeable lens 2 from being misplaced. One manner of utilization of the color rings Ca, Cb having the above effects is specifically described.

Figure 13A:
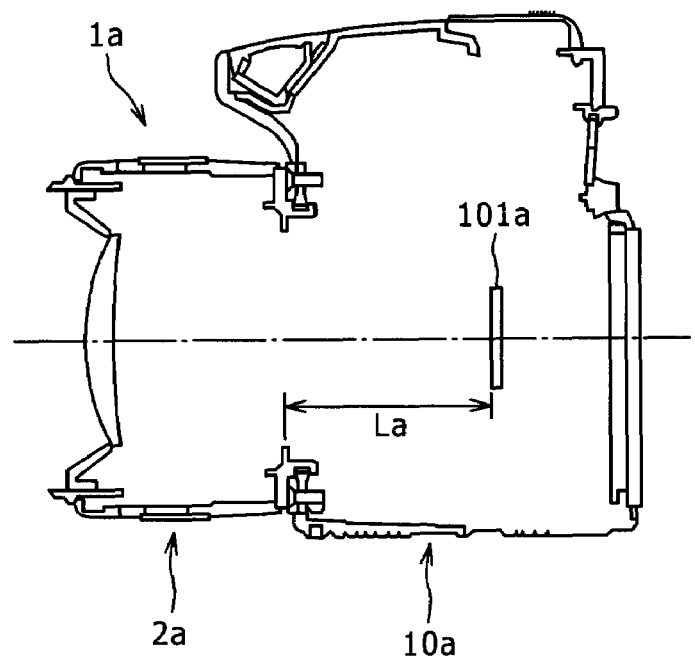
FIG. 13 is a schematic view for illustrating one manner of utilization of color rings.
Figure 13B:
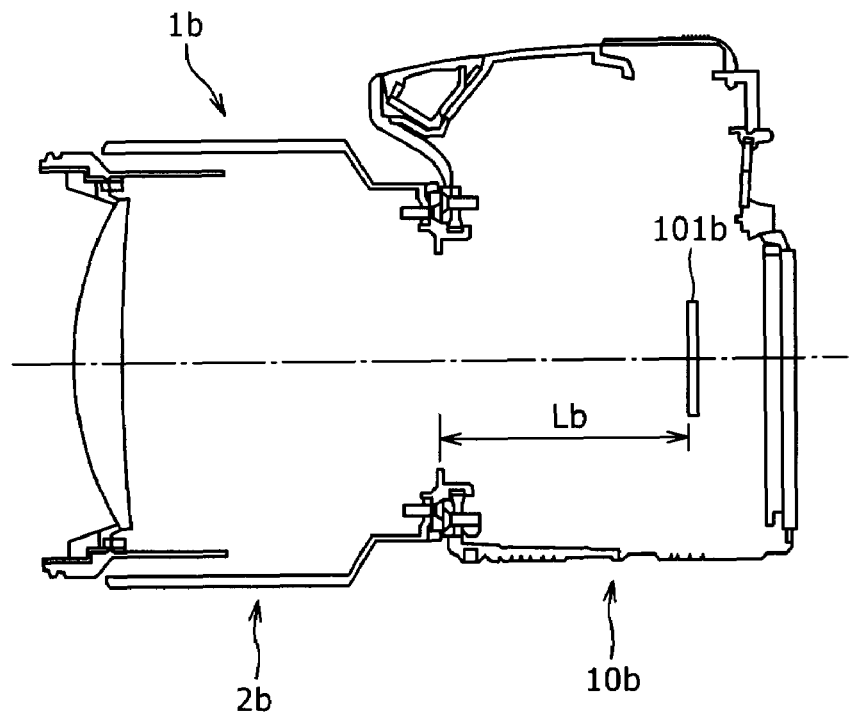

FIG. 13 is a schematic view showing one manner of utilization of the color rings Ca, Cb. In FIG. 13, FIG. 13A shows a condition in which an interchangeable lens 2*a* having a relatively short back focal length (a flange back) of a length La is mounted on an imaging apparatus (a camera body) 10*a* provided with an imaging device having an APS-sized imaging plane, for instance. On the other hand, FIG. 13B shows a condition in which an interchangeable lens 2*b* having a relatively long back focal length (a flange back) of a length Lb is mounted on an imaging apparatus 10*b* provided with an imaging device having a 35 mm-sized imaging plane, for instance.

Then, the color rings Ca, Cb of the imaging apparatus 10*a* and the interchangeable lens 2*a* that are available as one adequate imaging apparatus-interchangeable lens combination are colored in the same color (blue, for instance), while the color rings Ca, Cb of the imaging apparatus 10*b* and the interchangeable lens 2*b* that are also available as an adequate imaging apparatus-interchangeable lens combination are colored in the same color (red, for instance) but not blue. More specifically, the color predetermined depending on the imaging plane size and/or the flange back length is applied to the color rings, while with respect to the imaging apparatus and the interchangeable lens that are available as the adequate imaging apparatus-interchangeable lens combination meeting requirements on adaptations to the imaging plane size and/or the flange back length, both the color rings thereof are colored in the same color. Accordingly, when an attempt to mount the interchangeable lens 2*b* to the imaging apparatus 10*a* is made, for instance, the user may easily recognize the imaging apparatus 10*a* and the interchangeable lens 2*b* to be an inadequate imaging apparatus-interchangeable lens combination, because of disagreement between the color (blue) of the color ring Ca at the imaging apparatus 10*a*-side and the color (red) of the color ring Cb at the interchangeable lens 2*b*-side. As a result, it is possible to surely prevent the inadequate interchangeable lenses having no adaptation to the imaging plane size and/or the flange back length from being misplaced.

By respectively setting the colors of the color rings Ca, Cb for each adequate imaging apparatus-interchangeable lens combination, while providing the same-colored color rings Ca, Cb for the imaging apparatus and the interchangeable lens that are available as the adequate imaging apparatus-interchangeable lens combination as described the above, it is possible to easily judge whether or not the interchangeable lens 2 to be mounted is adequate for the imaging apparatus 10 in such a manner as to make comparison between the colors of the color rings Ca, Cb at the time of mounting of the interchangeable lens 2. As a result, it becomes possible to easily prevent the inadequate interchangeable lenses from being misplaced. Even in a case where a large number of adequate imaging apparatus-interchangeable lens combinations are available, it is also possible to easily cope with such cases by use of more colors for the color rings.

The color rings Ca, Cb of the imaging apparatus 10 and the interchangeable lens 2 do not always need to be formed using a printing technology, and it is also allowable to provide color rings taking a different configuration in which members forming the color rings Ca, Cb are attached to the imaging apparatus 10 and the interchangeable lens 2, as will be specifically described in the following.

Figure 14:
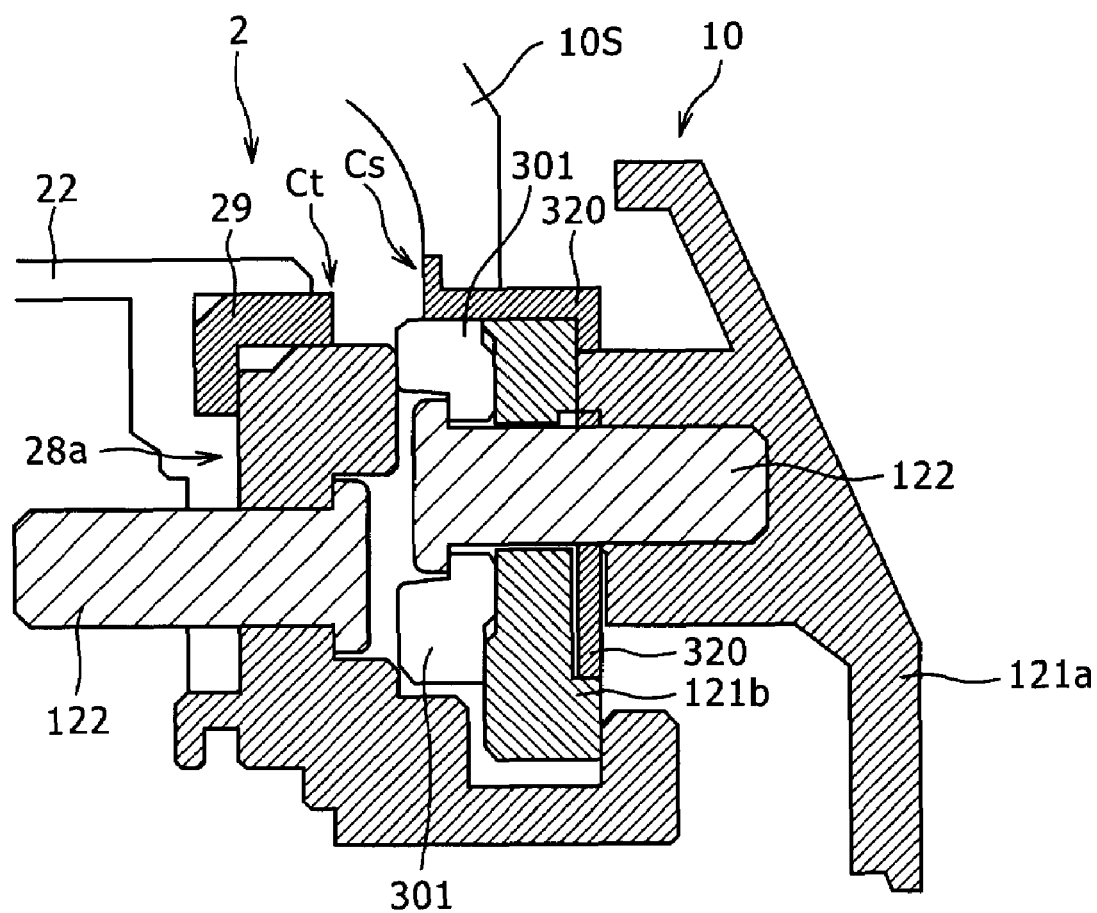
FIG. 14 illustrates one different configuration of the color rings.

FIG. 14 is a view corresponding to FIG. 12 and shows one different configuration of the color rings.

In the imaging apparatus 10, a ring-shaped member 320 having an approximately L-shaped sectional shape is interposed between two members 121*a*, 121*b* that seem to be those provided by dividing the mount receiving portion 121 shown in FIG. 12 back and forth, and also between an outer surface of the mount unit 301 and a housing 10*s* of the imaging apparatus 10, and is fixed in position with screws 122. The ring-shaped member 320 placed around the mount unit 301 as described above is made of materials such as aluminum, and is colored in orange, for instance, by anodic oxide coating. The ring-shaped member 320 having the above configuration ensures that a color ring Cs (see FIG. 1) is formed with the member 320 exposed to the front surface of the imaging apparatus 10.

In the interchangeable lens 2, a ring-shaped member 29 having an L-shaped sectional shape is interposed between a mount unit 28*a* corresponding to the mount unit 28 shown in FIG. 12 and the camera cone 22, and is fixed in position by screws 122. The ring-shaped member placed around the mount unit 28*a* as described above is made of materials such as aluminum, and is colored in orange, for instance, by anodic oxide coating. The ring-shaped member 29 having the above configuration ensures that a color ring Ct (see FIG. 11) is formed with the member 29 exposed to the rear end surface of the interchangeable lens 2.

In the color rings Cs, Ct formed with the members 320, 29 as described above, the colors of these color rings may be effectively prevented from coming off and the like.

Then, the color ring Cs is formed at a position that stands back by one step from the joint surface of the mount unit 301 of the imaging apparatus 10, like the above-described color ring Ca (see FIG. 12). The color ring Ct is also formed at a position that stands back by one step from the joint surface of the mount unit 28a of the interchangeable lens 2, like the above-described color ring Cb (see FIG. 12). Accordingly, it is possible to prevent the color rings Cs, Ct from being worn in contact with each other.

Figure 15:
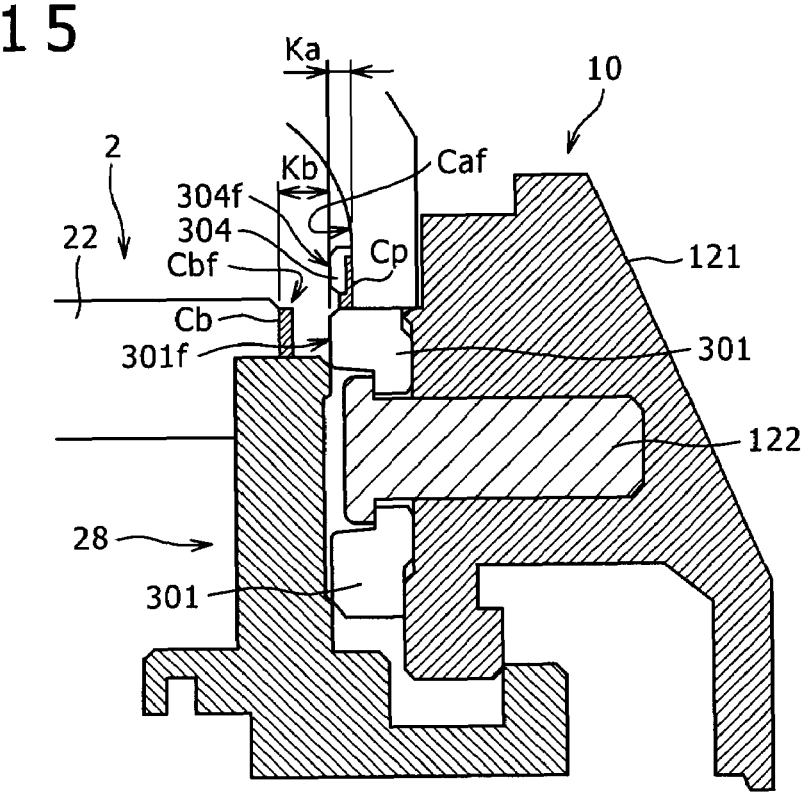
FIG. 15 illustrates other different configuration of the color rings.

FIG. 15 is a view corresponding to FIG. 12 and shows other different configuration of the color rings.

The mount unit 301 of the imaging apparatus 10 is provided with, on its periphery, a color ring Cp available as an annular or ring-shaped member colored in orange (or specific color) along the outer edge of the mount unit 301. The color ring Cp is made of plastics (or ABS resins) whose color itself is orange, and is fixedly provided on a front surface Caf of the imaging apparatus 10. With respect to an outer side of the color ring Cp in a radial direction, a ring-shaped member 304 is arranged, in engagement with the color ring Cp, along the outer edge of the color ring Cp (equivalent to a colored area in appearance). The color of the ring-shaped member 304 is the same as that of the mount unit 301. More specifically, a front end surface 304f of the ring-shaped member 304 made of the aluminum materials like the mount unit 301 is processed in the same manner as a mounting reference surface (a joint surface) 301f of the mount unit 301, and is thus supposed to have the same color as that of the joint surface 301f of the mount unit 301. In addition, the ring-shaped member 304 is fixedly provided on the front surface Caf of the imaging apparatus 10 such that the front end surface 304f at the subject side in the direction of the optical axis is at the same position as the joint surface 301f of the mount unit 301. In other words, the front end surface 304f of the ring-shaped member 304 and the joint surface 301f of the mount unit 301 are approximately flush with each other.

Figure 16:
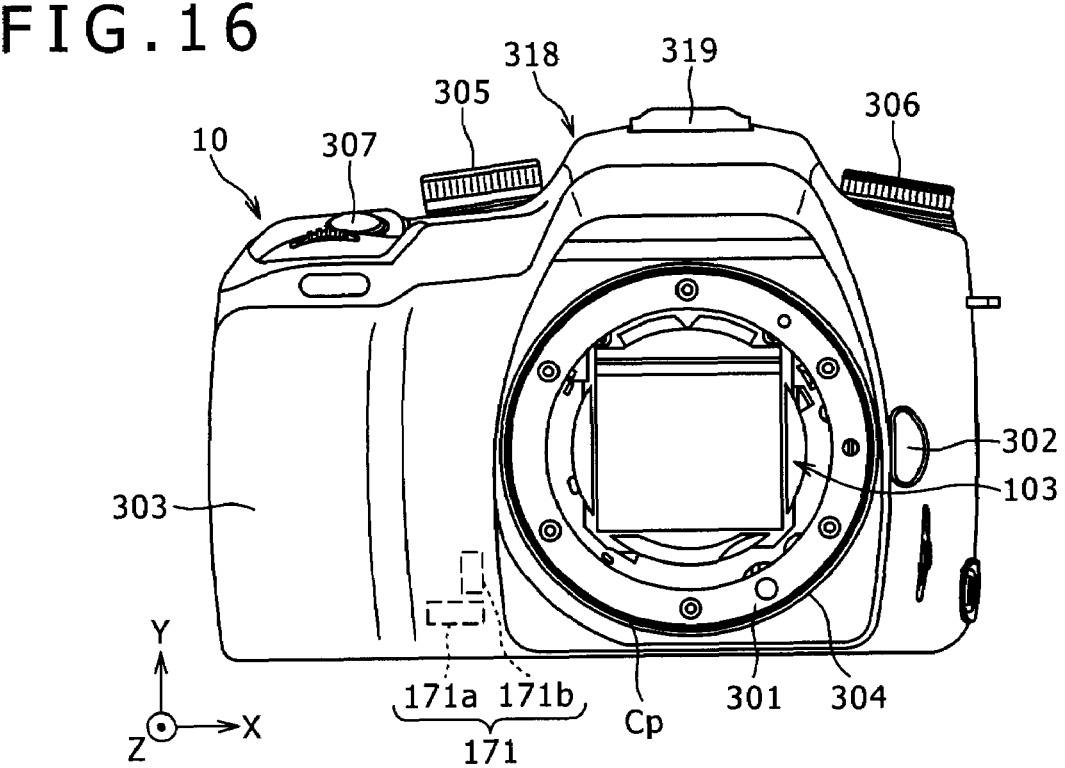
FIG. 16 is a front view of an imaging apparatus provided with a color ring and a ring-shaped member.

FIG. 16 is a front view of the imaging apparatus 10 provided with the color ring Cp and the ring-shaped member 304 described the above. As shown in FIG. 16, there is provided, at the outer side of the color ring Cp, the ring-shaped member 304 having the same color as that of the mount unit 301.

By providing the color ring Cp and the ring-shaped member 304 around the mount unit 301 as described above, the user may have an impression that the color ring Cp is formed just as a part of the joint surface of the mount unit 301. Then, the color ring Cp is emphasized more when mounting the interchangeable lens 2, and it thus becomes possible to surely prevent the inadequate interchangeable lenses from being misplaced.

In this case, changing a radial position (a distance from the center of a ring) where the ring-shaped member 304 is provided makes it possible to adjust the width of the color ring Cp visually recognizable from the outside.

While in FIG. 15, there is shown one instance where the ring-shaped member 304 is in an overlapped arrangement with respect to the outer side of the color ring Cp in the radial direction, the ring-shaped member 305 may be also arranged outside the color ring Cp without being overlapped in the direction of the optical axis.

While there has been described one instance where the color ring Cp is configured with the ring-shaped member, it is also allowable to form the color ring by means of coloring with printing as shown in FIG. 12. For the color ring formed by means of coloring in this manner, by providing the ring-shaped member 304 at the outside of the color ring formed as described above, it becomes possible to produce effect of surely preventing the color of a colored portion from coming off and the like. The color ring may be also formed by interposing the ring-shaped member between two members 121a, 121b that seem to be those provided by dividing the mount receiving portion 121 as shown in FIG. 14 back and forth.

Meanwhile, it is not always necessary to judge the combination of the imaging apparatus with the interchangeable lens to be adequate or not by using the above-described color rings, and it is also allowable to judge a combination of a converter lens with the interchangeable lens to be adequate or not, as will be specifically described in the following.

Figure 17:
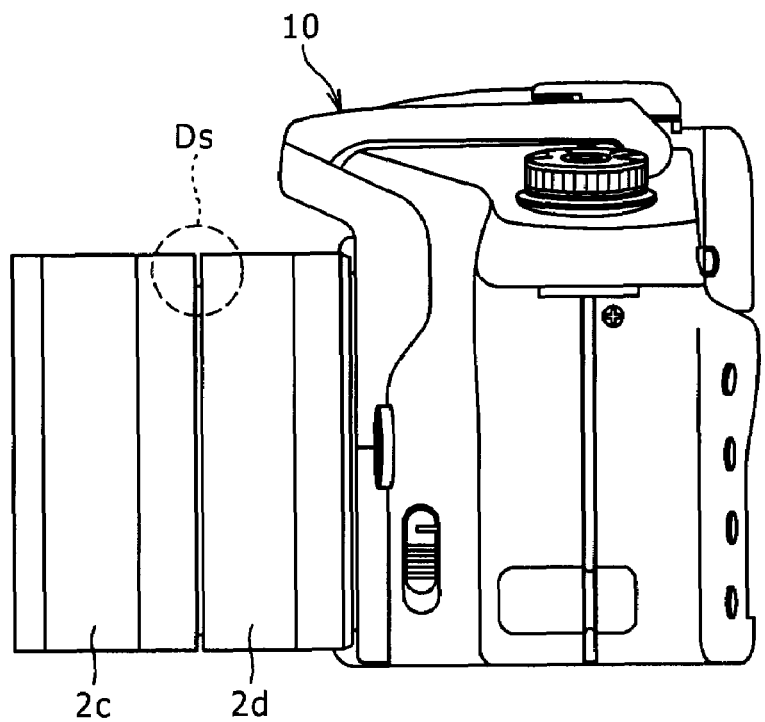
FIG. 17 illustrates a state in which a converter lens is placed between an imaging apparatus and an interchangeable lens.
Figure 18:
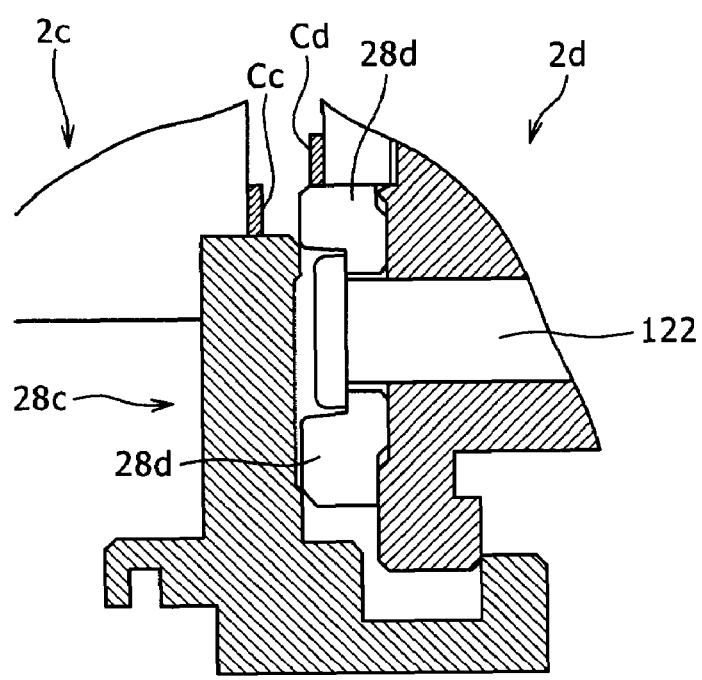
FIG. 18 shows a section of a portion encircled by a broken line in FIG. 17.

FIG. 17 shows a condition in which a converter lens 2d is placed between the imaging apparatus 10 and an interchangeable lens 2c. FIG. 18 shows a section of a portion Ds encircled by a broken line in FIG. 17.

Figure 19A:
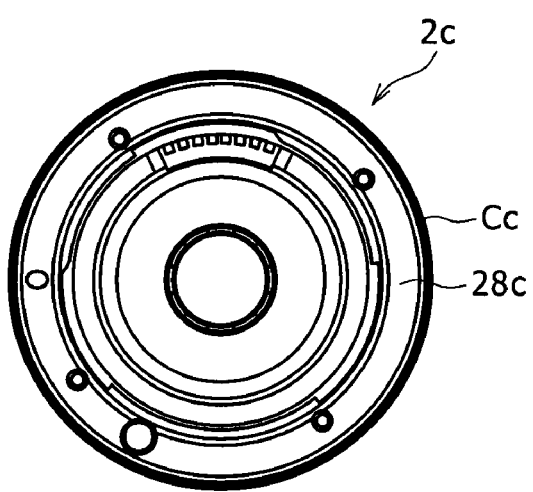
FIG. 19 shows a color ring provided on the interchangeable lens and a color ring provided on the converter lens.
Figure 19B:
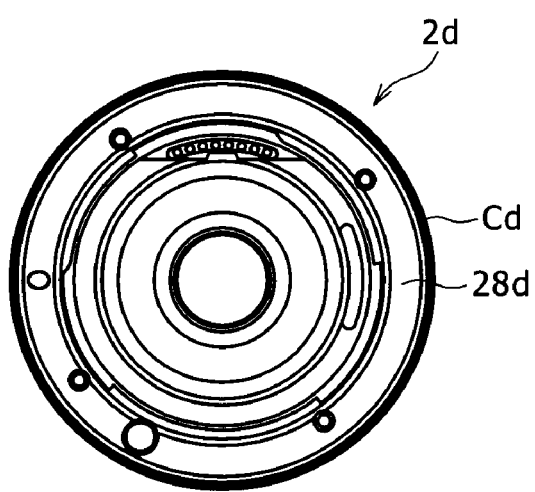

The interchangeable lens 2c is provided with, on its back surface, a color ring Cc (shown by a bold outline) colored in red, for instance, along an outer edge of a mount unit 28c, as shown in FIG. 19A. In addition, the converter lens 2d is provided with, on its front surface, a color ring Cd (shown by a bold outline) colored in red, for instance, along an outer edge of a mount unit 28d, as shown in FIG. 19B.

The color ring Cd of the converter lens 2d is formed in a manner that it is colored by printing on a front end surface, which stands back by one step from the joint surface of a mount unit 28d, of the camera cone as shown in FIG. 18. Likewise, the color ring Cc of the interchangeable lens 2c is also formed in a manner that it is colored by printing on a rear end surface, which stands back by one step from the joint surface of a mount unit 28c, of the camera cone. Accordingly, contact of the color rings Cc, Cd with each other may be eliminated, so that it is possible to prevent the color of these color rings from coming off.

With respect to the combination of the interchangeable lens 2c with the converter lens 2d as described above, similarly to the above-described combination of the imaging apparatus 10 with the interchangeable lens 2, coloring of the color rings Cc, Cd makes it possible to judge whether or not the interchangeable lens 2c is adaptable to be mounted to the converter lens 2d in such a manner as to judge the colors of the color rings Cc, Cd to be the same or not.

[Modifications]

The color rings in the above embodiments do not always need to have different colors depending on the imaging device size and/or the flange back (back focal) length, and it is also allowable to make coloring in different colors with respect to cases (1) to (3) as follows.

(1) Differences in Imaging Apparatus Types

Different colors may be applied to the color rings depending on whether the imaging apparatus 10 is of film-loaded camera type or digital camera type. This makes it possible to surely prevent the interchangeable lenses having no adaptation to the imaging apparatus type from being misplaced, resulting in prevention of improper shooting involving a drop of illuminance and the like.

(2) Internal Configuration of the Interchangeable Lens

Different colors may be applied to the color rings depending on whether or not the interchangeable lens 2 contains the actuators for driving the aperture and the focus lens. This makes it possible to surely prevent the interchangeable lenses having inadequate internal configurations from being misplaced.

(3) Differences in Optical Characteristics of the Interchangeable Lens

Different colors may be applied to the color rings when there are differences in optical characteristics of the interchangeable lens depending on whether or not an interchangeable lens having a large aperture or including an aspherical lens and the like is used. This makes it possible to surely prevent the interchangeable lenses having inadequate optical characteristics from being misplaced.

With respect to the color rings according to the above embodiments, it is also allowable to change color-code patterns or figures, color densities and transparencies of the above color rings for distinction for each adequate combination of the imaging apparatus with the interchangeable lens.

With respect to the color rings according to the above embodiments, it is also allowable to form the above color rings by sticking a colored ring-shaped seal (or sheet) along the outer edge of each mount unit, for instance.

The color rings according to the above embodiments do not always need to take a completely ring-like shape, and may be also in a circular arc shape in which a portion of the ring is missing.

The interchangeable lens according to the above embodiments is not limited to interchangeable lenses compatible with the imaging apparatus (the camera body), and may include interchangeable lenses having no compatibility with the imaging apparatus. The incompatible interchangeable lens as described above is physically difficult to be mounted to the imaging apparatus, resulting in no chance of mounting in practice. However, provision of the above color ring for the incompatible interchangeable lens may allow the lens judged to be inadequate for the imaging apparatus in the stage earlier than mounting works by the user.

According to the present invention, the mount unit of the imaging apparatus is provided with, on its periphery, a colored area having a specific color along an outer edge of the mount unit of the imaging apparatus. In addition thereto, with respect to a specific interchangeable lens, which meets predetermined requirements on adaptability to the above imaging apparatus, among interchangeable lenses, a mount unit, which is connected to the mount unit of the above imaging apparatus, of the above specific interchangeable lens is provided with, on its periphery, a colored area having the same color as the above specific color along an outer edge of the mount unit of the above specific interchangeable lens. As a result of this configuration, it is possible to easily prevent inadequate interchangeable lenses from being misplaced.

According to the present invention, the mount unit of the interchangeable lens is provided with, on its periphery, a colored area having a specific color along an outer edge of the mount unit of the interchangeable lens. Meanwhile, with respect to a specific imaging apparatus, which meets predetermined requirements on adaptability to the above interchangeable lens, among imaging apparatuses, a mount unit, which is connected to the mount unit of the above interchangeable lens, of the above specific imaging apparatus is provided with, on its periphery, a colored area having the same color as the above specific color along an outer edge of the mount unit of the above specific imaging apparatus. As a result of this configuration, it is possible to easily prevent inadequate interchangeable lenses from being misplaced.

It should be understood by those skilled in the art that various modifications, combinations, sub-combinations and alterations may occur depending on design requirements and other factors insofar as they are within the scope of the appended claims or the equivalents thereof.

CROSS REFERENCES TO RELATED APPLICATIONS

The present document contains subject matter related to Japanese Patent Applications JP 2006-156004 and JP 2007-057539 filed in the Japanese Patent Office on Jun. 5, 2006 and Mar. 7, 2007, respectively, the entire contents of which being incorporated herein by reference.

What is claimed is:

1. An imaging apparatus on which an interchangeable lens is detachably mounted, comprising:
    a body mount unit to which the interchangeable lens is attached, wherein:
    the body mount unit is provided with, on its periphery, a body colored area having a specific color circumferentially positioned along an outer edge of said body mount unit, and
    with respect to a specific interchangeable lens, which meets a predetermined requirement on adaptability to said imaging apparatus, among interchangeable lenses, a lens mount unit, which is connected to the body mount unit of the imaging apparatus, of the specific interchangeable lens is provided with, on its periphery, a lens colored area having the same color as the specific color circumferentially positioned along an outer edge of the lens mount unit of the specific interchangeable lens.

2. The imaging apparatus according to claim 1, wherein the body colored area is a ring-shaped area.

3. The imaging apparatus according to claim 1, further comprising:
    an imaging sensor for generating image signals relating to a subject, wherein:
    the predetermined requirement is a requirement on adaptation to an imaging plane size of the imaging sensor, and with respect to the body colored area, a color prescribed depending on the imaging plane size is applied.

4. The imaging apparatus according to claim 1, the imaging apparatus further comprising a flange back having a length, wherein:
    the predetermined requirement met by the specific interchangeable lens is that the specific interchangeable lens is compatible with the length of the flange back of the imaging apparatus, and
    with respect to the body colored area, the specific color is a color selected depending on the length of the flange back.

5. The imaging apparatus according to claim 1, wherein:
    with respect to the body colored area, different colors are applied depending on whether the imaging apparatus is of film-loaded camera type or of digital camera type.

6. The imaging apparatus according to claim 1, wherein:
    the body colored area is provided by means of coloring with printing.

7. The imaging apparatus according to claim 1, further comprising an annular member colored in the specific color and arranged around the body mount unit, wherein:
    the body colored area is formed with the annular member exposed to a front surface of the imaging apparatus.

8. The imaging apparatus according to claim 1, wherein the body colored area is provided on a plane parallel to a joint surface of the body mount unit.

9. The imaging apparatus according to claim 1, wherein the body colored area is provided at a position standing back by a fixed distance from a joint surface of the body mount unit.

10. The imaging apparatus according to claim 9, further comprising an annular member arranged along the outer edge of said body colored area, wherein:
a front end surface of the annular member and the joint surface of the body mount unit are placed on an approximately same plane.

11. The imaging apparatus according to claim 10, wherein:
a front end surface of the annular member has the same color as that of the joint surface of the body mount unit.

12. An interchangeable lens detachably mounted on an imaging apparatus, comprising:
a lens mount unit attached to the imaging apparatus; wherein:
the lens mount unit is provided with, on its periphery, a lens colored area having a specific color circumferentially positioned along an outer edge of the lens mount unit, and
with respect to a specific imaging apparatus, which meets predetermined requirements on adaptability to the interchangeable lens, among imaging apparatuses, a body mount unit, which is connected to the lens mount unit of the interchangeable lens, of the specific imaging apparatus is provided with, on its periphery, a body colored area having the same color as the specific color circumferentially positioned along an outer edge of the body mount unit of the specific imaging apparatus.

13. The interchangeable lens according to claim 12, wherein the lens colored area is a ring-shaped area.

14. The interchangeable lens according to claim 12, wherein:
the specific imaging apparatus has a flange back having a length,
one of the predetermined requirements met by the specific imaging apparatus is that the length of the flange back is compatible with the interchangeable lens, and
with respect to the lens colored area, the specific color is a color selected depending on the length of the flange back.

15. The interchangeable lens according to claim 12, further comprising an annular member colored in the specific color and arranged around the lens mount unit, wherein:
the lens colored area is formed with the annular member exposed to face a front surface of the imaging apparatus.

16. The interchangeable lens according to claim 12, wherein the lens colored area is provided on a plane parallel to a joint surface of the lens mount unit.

17. The interchangeable lens according to claim 12, wherein the lens colored area is provided at a position standing back by a fixed distance from a joint surface of the lens mount unit.

18. The interchangeable lens according to claim 17, further comprising an annular member circumferentially arranged along the outer edge of said lens colored area, wherein:
a front end surface of the annular member and the joint surface of the lens mount unit are placed on an approximately same plane.

19. The interchangeable lens according to claim 12, wherein:
a front end surface of the annular member has the same color as that of the joint surface of the lens mount unit.

20. An imaging apparatus for capturing images, comprising:
a camera body including a body mount unit provided with a body colored area having a specific body color circumferentially positioned along an outer edge of said body mount unit;
an interchangeable lens including a lens mount unit provided with a lens colored area having a specific lens color circumferentially positioned along an outer edge of said lens mount unit, wherein
said lens mount unit of said interchangeable lens is configured to detachably engage said body mount unit of said camera body, and
said specific body color and said specific lens color are a same color.

* * * * *